J. H. Roome,
Shears.
N° 21,369.  Patented Aug. 31, 1858.

UNITED STATES PATENT OFFICE.

JAMES H. ROOME, OF NEW YORK, N. Y.

SHEARS.

Specification of Letters Patent No. 21,369, dated August 31, 1858.

*To all whom it may concern:*

Be it known that I, J. H. ROOME, of the city, county, and State of New York, have invented a new and useful Improvement in Tailors' and other Shears; and I do hereby declare that the following is a full, clear, and exact description of the same, reference being had to the accompanying drawings, making a part of this specification, in which—

Figure 1:
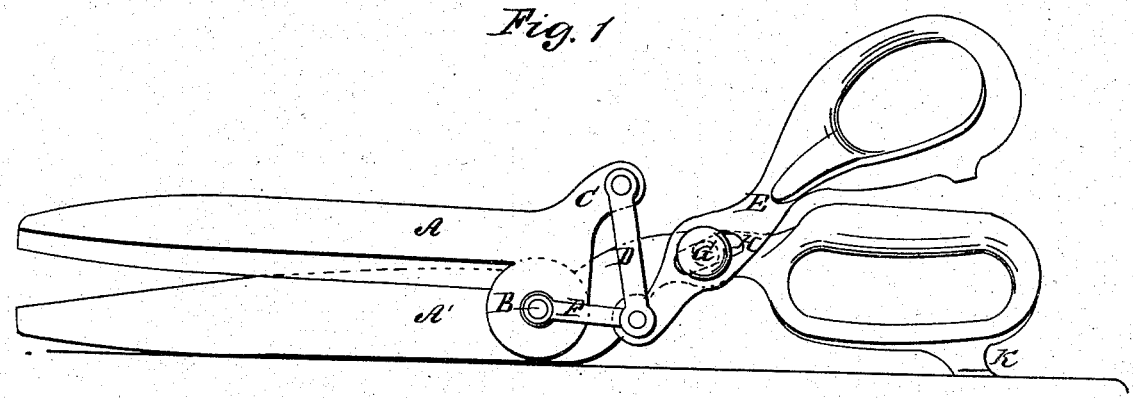
Figure 2:

Figure 1, is a side elevation of a pair of tailors' shears constructed after the improved plan. Fig. 2, is a top or bird's eye view of ditto.

Similar letters in the figures represent corresponding parts.

The nature of this invention and improvement, consists in forming the handle and upper cutting blade of the shears in two parts, and so connecting the former to the body or shank of the lower cutting blade and to the upper one, as to enable the leverage exerted by the thumb to be gradually increased with the closing of the blades.

To enable others skilled in the art to make and use my invention, I will proceed to describe its construction and operation.

The rear end of the upper lever or blade A, terminates at or near the pivot or fulcrum B, with a wing C, which extends upward and backward from said pivot or fulcrum, and is provided with a connecting rod D, which is jointed to the same by a bolt or pin at one end, and to the forward end of the upper handle E, by a corresponding bolt or pin at its opposite end. This end of the upper handle is also connected to the pivot or fulcrum on which the blade of the shears vibrates by means of an additional connecting rod F, through an opening in one end of which the said pivot or fulcrum passes, its opposite end being fastened to the bolt or pin at the forward end of said handle. The grasping end of this upper handle is arranged immediately above the corresponding portion of the lower cutting blade A′, and in the proper relation to the same to enable the two to be readily grasped between the four fingers and thumb of the operator, and its more flattened portion extends forward and downward, beside the flattened side of the handle of the lower blade, to the connecting rods D, F, being secured to the said lower handle by a bolt or pin G, which passes through a slot H, in the upper handle, and is screwed into an opening in the lower one immediately in advance of the grasping portion of the same. This slot H, enables the fulcrum on which the upper handle moves to be changed by the action of the connecting rod F, in the following manner:—

When the shears are placed in the position represented in Fig. 1, with the broad edge of its lower cutting blade A′, resting on the table and its handle supported by the projection K, the upper blade A, is opened by the action of the thumb, which causes the upper handle to descend forward, and the bolt or fulcrum G, upon which it traverses to be brought to the upper end of the slot H. After the fabric or material to be cut is placed between the blades, and the grasping end of the upper handle is depressed by the thumb, the said handle is forced upward so as to bring the bolt or fulcrum G, nearer the lower end of the slot H, by the action of the additional connecting rod F, which causes the leverage of the handle E, to be increased with the increased resistance offered to the closing of the blades, as the cutting process approaches their forward ends.

I do not claim, broadly, the connection of one blade with its handle, by means of a link or rod; for I am aware that this is old; nor do I claim, broadly, the slotting of the stationary blade and handle; but

What I claim as my invention and desire to secure by Letters Patent, is,

The combination of the additional connecting rod F, with the rod D, and upper slotted handle E, for enabling the leverage exerted by the thumb to be increased with the closing of the upper blade A, substantially as before described.

JAMES H. ROOME.

Witnesses:
W. HAUFF,
W. TUSCH.